US012689200B2

(12) United States Patent
Phillips et al.

(10) Patent No.: US 12,689,200 B2
(45) Date of Patent: Jul. 21, 2026

(54) CABLE GLAND

(71) Applicant: HELLERMANNTYTON (PTY) LIMITED, Frankenwald (CA)

(72) Inventors: Peter Don Phillips, Pretoria (CA); Barend Hercules Philippus Swanepoel, Pretoria (CA)

(73) Assignee: HELLERMANNTYTON (PTY) LIMITED, Johannesburg (ZA)

( * ) Notice: Subject to any disclaimer, the term of this patent is extended or adjusted under 35 U.S.C. 154(b) by 194 days.

(21) Appl. No.: 18/553,367

(22) PCT Filed: Mar. 30, 2022

(86) PCT No.: PCT/IB2022/052930
§ 371 (c)(1),
(2) Date: Sep. 29, 2023

(87) PCT Pub. No.: WO2022/208377
PCT Pub. Date: Oct. 6, 2022

(65) Prior Publication Data
US 2024/0106216 A1 Mar. 28, 2024

(30) Foreign Application Priority Data
Mar. 30, 2021 (ZA) .................................. 2021/02125

(51) Int. Cl.
*H02G 3/34* (2006.01)
*H02G 3/06* (2006.01)
*H02G 15/013* (2006.01)

(52) U.S. Cl.
CPC ............. *H02G 3/34* (2013.01); *H02G 3/0625* (2013.01); *H02G 15/013* (2013.01)

(58) Field of Classification Search
CPC .. H02G 3/18; H02G 3/22; H02G 3/34; H02G 3/0625; H02G 3/083; H02G 3/088;
(Continued)

(56) References Cited

U.S. PATENT DOCUMENTS 4,415,166 A * 11/1983 Beia ........................ F16J 15/441
277/925
4,656,689 A * 4/1987 Dennis ...................... F16L 5/10
16/2.2
(Continued)

FOREIGN PATENT DOCUMENTS

EP 2950125 B1 10/2019
JP H0736545 U 7/1995

OTHER PUBLICATIONS

International Search Report for PCT/IB2022/052930 mailed Jun. 29, 2022, 4 pages.
(Continued)

*Primary Examiner* — William H. Mayo, III
(74) *Attorney, Agent, or Firm* — Nixon & Vanderhye P.C.

(57) ABSTRACT

A cable gland comprises has a body defining a passage, a sealing arrangement and a cable gripping member. The passage is configured to receive a cable having a surface. The sealing arrangement and the cable gripping member are locatable in the passage. The body has a sealing surface and a seal abutment surface adjacent the passage. The sealing arrangement has a seal, a seal deforming member and a link. The seal has an inner surface and an outer surface and defines an opening for receiving the cable and a further opening between the inner surface and the outer surface. The seal seals against the sealing surface as well as against the surface. The cable gripping member, the seal deforming member and the link form an electrically conductive train between a steel wire armour layer of the cable and a conductive part of the cable gland.

19 Claims, 10 Drawing Sheets

(58) Field of Classification Search
 CPC .... H02G 15/007; H02G 15/013; H02G 15/02;
       H02G 15/0658; H02G 3/0675; H02G
       15/04; H02G 15/046; H01R 3/06; H01R
       3/0641; H01R 4/64; H01R 4/646
 USPC .......... 174/65 G, 65 SS, 74 R, 75, 78, 84 R,
       174/88 C; 439/98, 583, 610; 277/603,
       277/606
 See application file for complete search history.

(56) References Cited

U.S. PATENT DOCUMENTS

| | | | | | |
|---|---|---|---|---|---|
| 4,835,342 | A | * | 5/1989 | Guginsky ............ | H02G 3/0675 |
| | | | | | 285/151.1 |
| 5,059,747 | A | * | 10/1991 | Bawa ................... | H02G 3/0675 |
| | | | | | 174/541 |
| 5,087,795 | A | * | 2/1992 | Guginsky ............ | H02G 3/0675 |
| | | | | | 174/541 |
| 5,545,854 | A | * | 8/1996 | Ishida .................... | H02G 3/081 |
| | | | | | 16/2.2 |
| 5,621,191 | A | * | 4/1997 | Norris ................. | H02G 3/0675 |
| | | | | | 174/653 |
| 5,927,725 | A | * | 7/1999 | Tabata ............... | H01R 13/5205 |
| | | | | | 174/152 G |
| 5,942,730 | A | * | 8/1999 | Schwarz ................ | H02G 15/04 |
| | | | | | 174/84 R |
| 7,156,671 | B2 | * | 1/2007 | Kauth ...................... | H01R 4/66 |
| | | | | | 439/98 |
| 8,513,543 | B1 | * | 8/2013 | Lin ...................... | H02G 15/013 |
| | | | | | 174/656 |
| 9,325,163 | B2 | * | 4/2016 | Pelletier .............. | H02G 15/007 |
| 9,490,619 | B2 | * | 11/2016 | Smith ................... | H02G 3/088 |
| 10,644,437 | B1 | | 5/2020 | Campos et al. | |
| 2004/0069522 | A1 | * | 4/2004 | Jackson ................. | H02G 3/065 |
| | | | | | 174/669 |
| 2004/0074662 | A1 | * | 4/2004 | Hand ................... | H02G 3/0666 |
| | | | | | 174/667 |
| 2015/0200531 | A1 | * | 7/2015 | Chiu .................... | H02G 15/013 |
| | | | | | 277/607 |
| 2022/0123541 | A1 | * | 4/2022 | Mood ................. | H02G 3/0666 |

OTHER PUBLICATIONS

Written Opinion of the ISA for PCT/IB2022/052930 mailed Jun. 29, 2022, 7 pages.

* cited by examiner

CABLE GLAND

CROSS-REFERENCE TO RELATED APPLICATIONS

This application is the U.S. national phase of International Application No. PCT/IB2022/052930 filed Mar. 30, 2022, which designated the U.S. and claims priority to ZA 2021/02125 filed Mar. 30, 2021, the entire contents of each of which are hereby incorporated by reference.

INTRODUCTION AND BACKGROUND

This invention relates to a cable gland and more particularly to a cable gland suitable for retaining different types of cables in a position relative to a support wall.

Different cable types include steel wire armoured (SWA) cables and unarmoured cables, i.e. cables without armouring.

Known cable glands are cable type specific in that a first type of cable gland is used to retain a SWA cable to a support wall and a second type of cable gland is used to retain an unarmoured cable to a support wall. Disadvantages of these cable type specific cable glands are that manufacturing costs are higher and incorrect consumer selection may occur.

Another disadvantage of the cable glands known in the art is that installation of these cable glands on cables is awkward and laborious. This is particularly the case when the first type of cable gland is installed on an SWA cable. The first type of cable gland comprises at least a first gland body part, a second gland body part various internal parts including an internal conical member or cone. Installation of such a cable gland onto a cable requires at least the following steps: a) disassembling of the cable gland; b) threading the first gland body part with the cable; c) bending (also known as flaring) steel wire armouring of the cable away from an inner bedding of the cable; d) threading the conical member with the cable and locating the conical member between the inner bedding and the bent (flared) steel wire armouring; e) threading the second gland body part with the cable; and f) assembling the cable gland. During the above installation process, an artisan may easily drop one of the parts of the cable gland, causing undesirable loss of time and/or loss of the dropped part.

OBJECT OF THE INVENTION

Accordingly, it is an object of the present invention to provide a cable gland with which the applicant believes the aforementioned disadvantages may at least be alleviated or which may provide a useful alternative for the known cable glands.

SUMMARY OF THE INVENTION

According to the invention there is provided a cable gland comprising:

an elongate body defining an axially extending passage configured to receive a cable having an outer surface, the body comprising an inner sealing surface and a seal abutment surface adjacent the passage; and a cable gland sealing arrangement locatable in the passage, the cable gland sealing arrangement comprising:

an annular elastomeric seal comprising an inner sealing surface and an outer sealing surface and defining a first opening adjacent the inner sealing surface for receiving the cable and at least one further opening between the inner sealing surface and the outer sealing surface;

an annular seal deforming member comprising a body having a first face which, in use, abuts the annular elastomeric seal, a second opposed face and an inner wall between the first face and the second face, the inner wall defining a third opening for receiving the cable, and at least one axially extending link which, in use, extends through the at least one further opening and between the first face of the annular seal deforming member and the seal abutment surface.

The cable gland sealing arrangement may be configured such that when the annular elastomeric seal is axially compressed between the abutment surface and the first face of the annular seal deforming member, the annular elastomeric seal is deformed such that the inner sealing surface of the annular elastomeric seal is urged inwardly to seal against the outer surface of the cable and the outer sealing surface of the annular elastomeric seal is urged outwardly to seal against the inner sealing surface adjacent the passage.

The at least one axially extending link may be flexible, but preferably is rigid and may be integrally formed with any one of a) the first face of the annular seal deforming member; and b) the seal abutment surface.

The body of the cable gland may comprise a first body part and a second body part which are axially adjacent each other, the first and second body parts comprising respective mutually cooperating formations which, when actuated, cause the first and second body parts to be urged towards each other and to compress the annular elastomeric seal between the seal abutment surface and the first face of the annular seal deforming member.

The first body part may define a first part of the axially extending passage which first part extends from a first end of the first body part to a second end of the first body part, a first of the mutually cooperating formations may be provided towards the second end of the first body part, and the second body part may comprise first and second concentric tubular parts, the second tubular part having a larger radius than the first tubular part, the first tubular part defining a second part of the axially extending passage which second part extends from a first end of the first tubular part to a second end of the first tubular part, the second end of the first tubular part providing the seal abutment surface and the second tubular part comprising a second of said mutually cooperating formations.

The first tubular part may be made of electrically conductive material.

The annular elastomeric seal may be circular in configuration and the inner sealing surface and the outer sealing surface may be concentric with each other about a centre axis of the seal.

In one embodiment, the annular elastomeric seal may comprise a first annular elastomeric seal part having an inner wall having an inner diameter and a concentric second annular elastomeric seal part having an outer wall having an outer diameter which is smaller than the inner diameter of the first annular elastomeric seal part, the first annular elastomeric seal part presenting the outer sealing surface of the annular elastomeric seal, the second annular elastomeric seal part presenting the inner sealing surface of the annular elastomeric seal and the at least one further opening may be ring-shaped and defined between the inner wall of the first annular elastomeric seal part and the outer wall of the concentric second annular elastomeric seal part and the at least one axially extending link may be formed integrally with the first face and may comprise a tubular rigid stub extending through the ring-shaped further opening.

The body of the annular seal deforming member may be circular in configuration.

In another embodiment of the annular elastomeric seal, the at least one further opening may comprise a plurality of spaced sockets located on a first circle between the inner sealing surface and the outer sealing surface of the annular elastomeric seal, the first circle having a first radius.

The plurality of spaced sockets may be equi-spaced from one another on the first circle by a first distance.

The at least one axially extending link may comprise a plurality of prongs which are integrally formed with the first face on a second circle having a second radius.

The first circle and second circle may be concentric, and the first radius may be equal to the second radius.

Each of the plurality of prongs may be tapered in a direction from a respective proximal end immediately adjacent the first face towards a respective distal end of the prong.

The plurality of prongs may be equi-spaced from one another by a second distance which is the same as the first distance.

Each of the plurality of spaced sockets may be shaped similar to a prong.

A cable gripping member may be locatable in the axially extending passage, the cable gripping member comprising a body having a first end, a second end, an outer wall and an inner wall defining a passage for receiving the cable, the inner wall comprising formations for gripping the cable.

The cable gripping member may be tubular in configuration and may define an axial slot extending from the first end of the body of the cable gripping member to the second end of the body of the cable gripping member.

The outer wall of the cable gripping member may slope from the first end having a first outer diameter to the second end having a second outer diameter, which is larger than the first outer diameter.

The inner wall of the cable gripping member may slope from the first end having a first inner diameter to the second end having a second inner diameter, which is smaller than the first inner diameter.

The second face of the annular seal deforming member may, in use, abut the second end of the cable gripping member.

The cable gripping member may be resiliently constrictable.

In some embodiments, at least one, but preferably all of the cable gripping member, the annular seal deforming member and the at least one axially extending link may be made of electrically conductive material.

According to another aspect of the invention there is provided a cable gland comprising:

a body defining an axially extending passage configured to receive a cable having an outer surface and the body comprising a sloping formation located adjacent the first part of the passage;

an electrically conductive cable gripping member locatable in the axially extending passage, the cable gripping member comprising a body having an outer wall comprising an outer formation for cooperation with the sloping formation and an inner wall defining a passage for receiving the cable, the inner wall comprising formations for gripping the cable in a constrictive manner when the outer formation cooperates with the sloping formation.

4

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
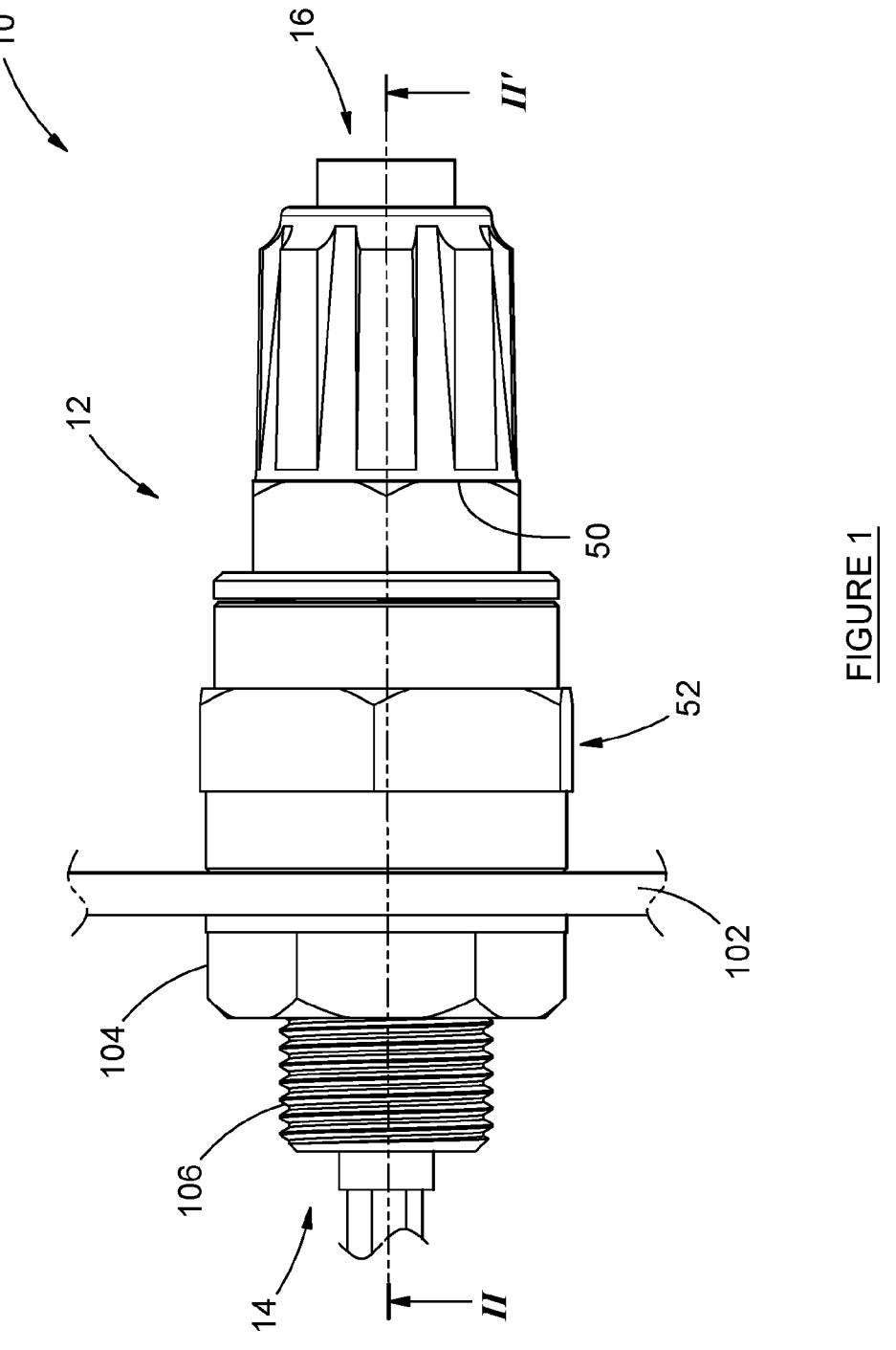
FIG. 1 is a diagrammatic side view of a first example embodiment of a cable gland in an assembled form.

A first example embodiment of a cable gland is generally designated by the reference numeral 10 in FIGS. 1 to 6.

Figure 2:
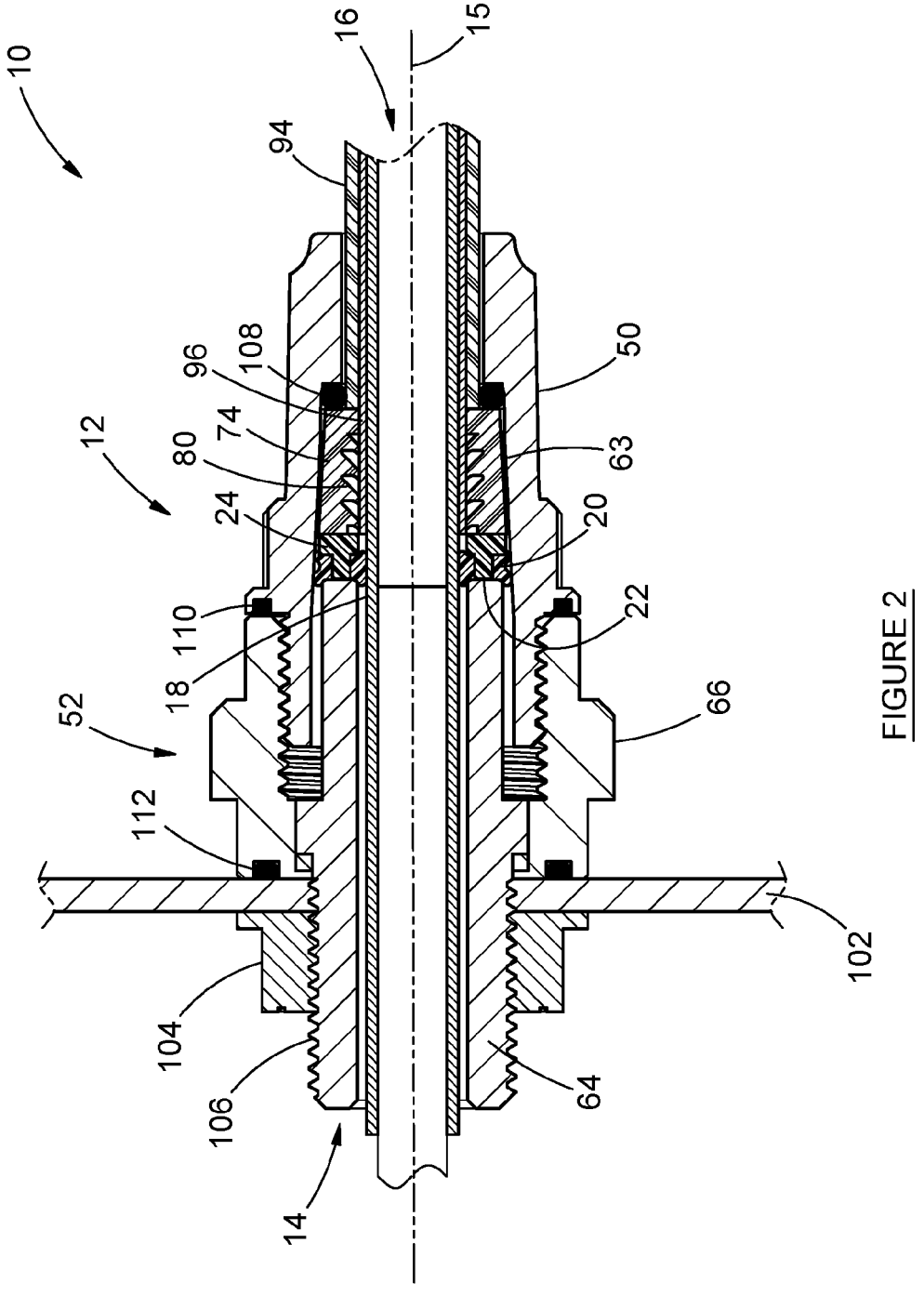
FIG. 2 is a section on line II in FIG. 1.

Referring to FIGS. 1 and 2, the cable gland 10 comprises an elongate body 12 defining an axially extending passage 14 (best shown in FIG. 2) having a longitudinal axis 15. The axially extending passage 14 is configured to receive a cable 16 having an outer surface 18.

Figure 6:
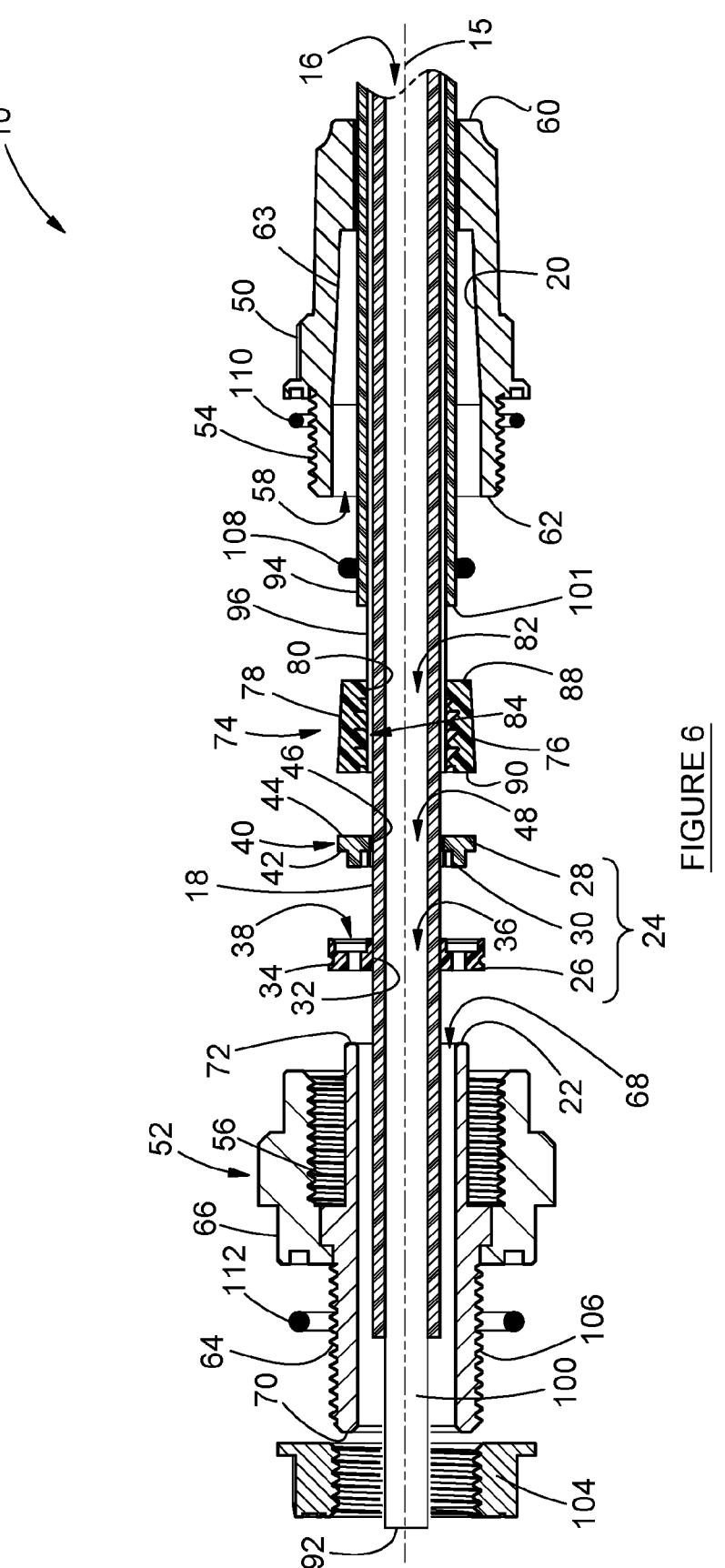
FIG. 6 is a section on line VI in FIG. 5.

Referring to FIGS. 2 and 6, the elongate body 12 presents an inner sealing surface 20 and a seal abutment surface 22 adjacent the axially extending passage 14. A cable gland sealing arrangement 24 is locatable in the axially extending passage 14. The cable gland sealing arrangement 24 comprises an annular elastomeric seal 26, an annular seal deforming member 28 and at least one axially extending rigid link 30.

Figure 3:
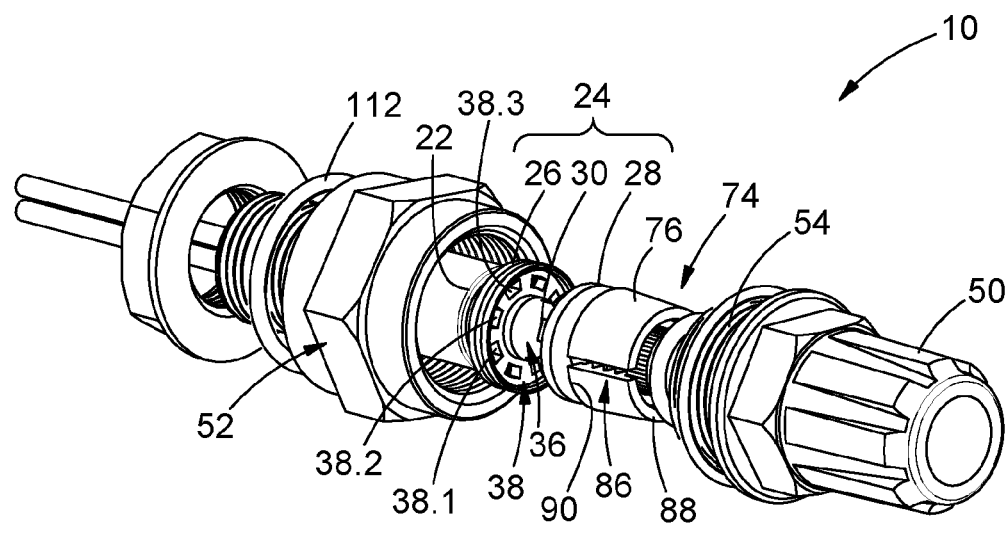
FIG. 3 is a first diagrammatic perspective view of the cable gland in an exploded form.
Figure 4:
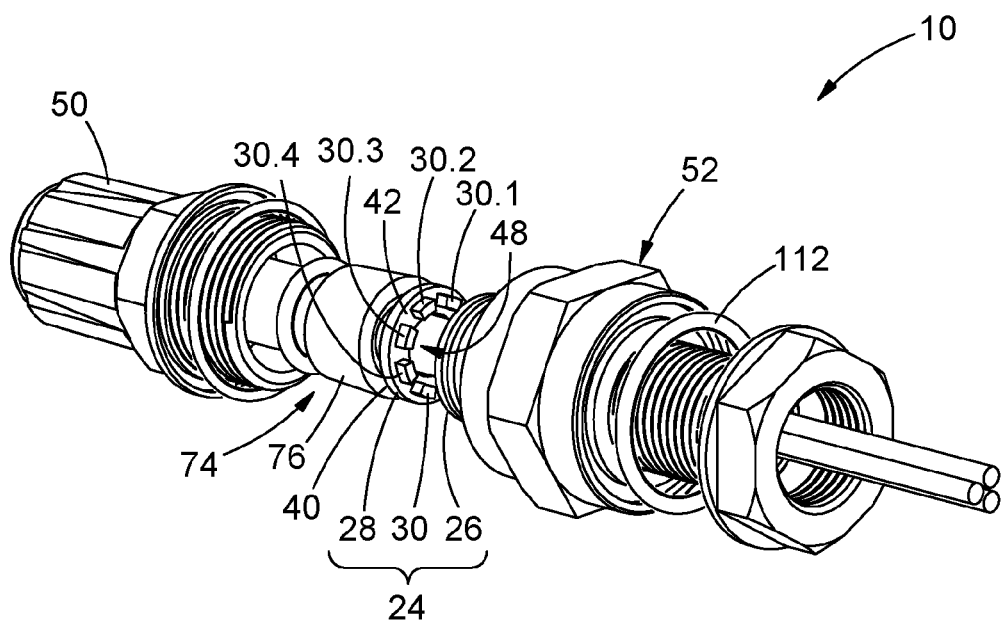
FIG. 4 is a second diagrammatic perspective view of the cable gland in the exploded form.
Figure 5:
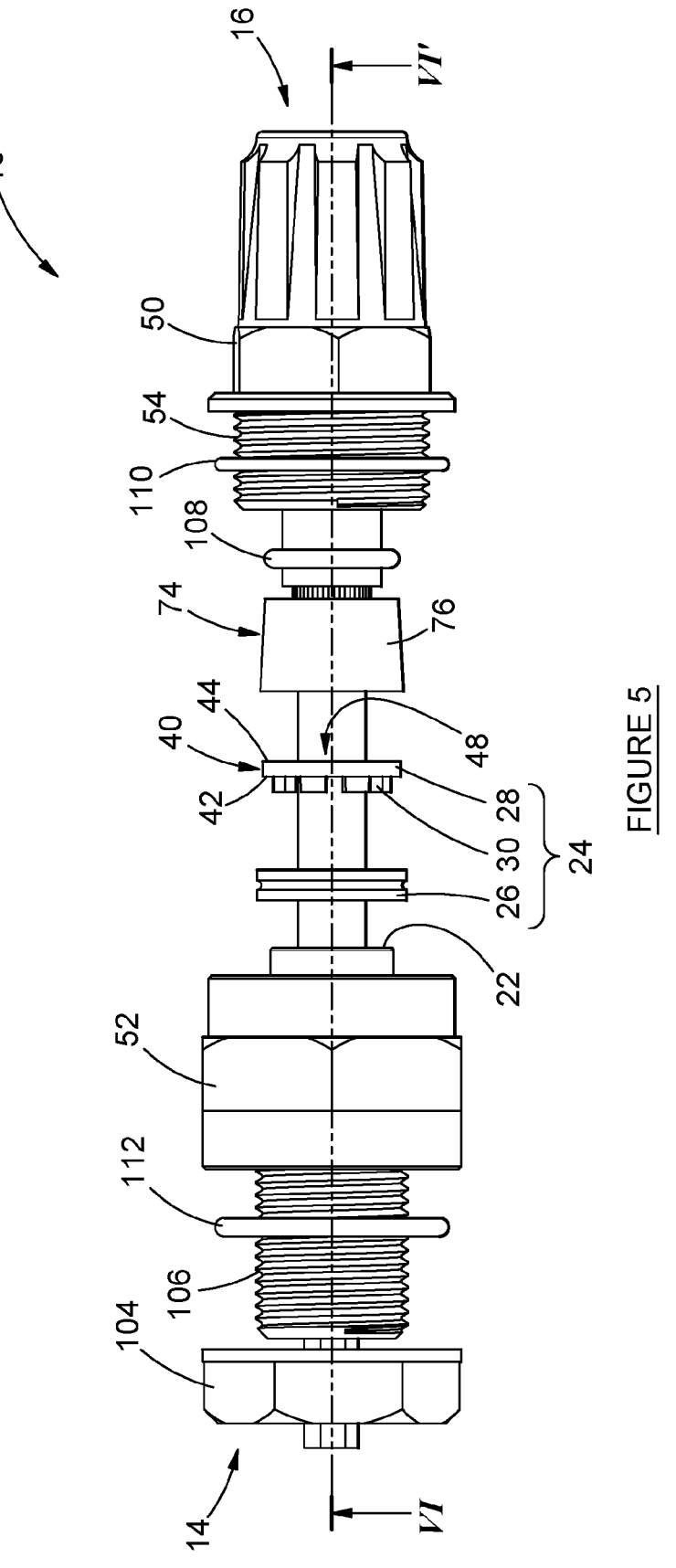
FIG. 5 is a diagrammatic side view of the cable gland in the exploded form.

The annular elastomeric seal 26 (best shown in FIGS. 3 and 6) comprises an inner sealing surface 32 (best shown in FIG. 6) and an outer sealing surface 34 (also best shown in FIG. 6). The annular elastomeric seal 26 defines a first opening 36 adjacent the inner sealing surface 32 for receiving the cable 16, and at least one further opening 38 between the inner sealing surface 32 and the outer sealing surface 34. The annular elastomeric seal 26 is circular in configuration and the inner sealing surface 32 and the outer sealing surface 34 are concentric with each other about a centre axis of the annular elastomeric seal. In use, the inner sealing surface 32 seals against the outer surface 18 of the cable 16, and the outer sealing surface 34 seals against the inner sealing surface 20 adjacent the passage 14. As best shown in FIG. 3, the at least one further opening 38 comprises a plurality of sockets 38.1 to 38.n which are located on a first circle between the inner sealing surface 32 and the outer sealing surface 34 of the annular elastomeric seal 26. The plurality of sockets 38.1 to 38.n are equi-spaced from one another on the first circle by a first distance.

The annular seal deforming member 28 (best shown in FIG. 6) comprises a body 40 which is circular in configuration. The body 40 comprises a first face 42, a second opposed face 44 and an inner wall 46 between the first face 42 and the second face 44. The inner wall 46 defines an opening 48 for receiving the cable 16. In use, the first face 42 abuts the annular elastomeric seal 26.

As best shown in FIGS. 2 to 6, the at least one axially extending rigid link comprises a plurality of prongs 30.1 to 30.$n$. The plurality of prongs 30.1 to 30.$n$ are integrally formed with the first face 42 of the annular seal deforming member 28. In other embodiments (not shown) the plurality of prongs 30.1 to 30.$n$ may be integrally formed with the seal abutment surface 22. The plurality of prongs 30.1 to 30.$n$ are located on a second circle of the same radius as the first circle on which the plurality of sockets 38.1 to 38.$n$ are located. Each of the plurality of prongs 30.1 to 30.$n$ extends axially from a respective proximal end (immediately adjacent the first face 42) to a respective distal end. Each of the plurality of prongs 30.1 to 30.$n$ is tapered in a direction from the respective proximal end to the respective distal end. The plurality of prongs 30.1 to 30.$n$ are equi-spaced from one another on the second circle and by a second distance which is the same as the first distance. Each of the plurality of sockets 38.1 to 38.$n$ is shaped similar to a prong.

Figure 8:
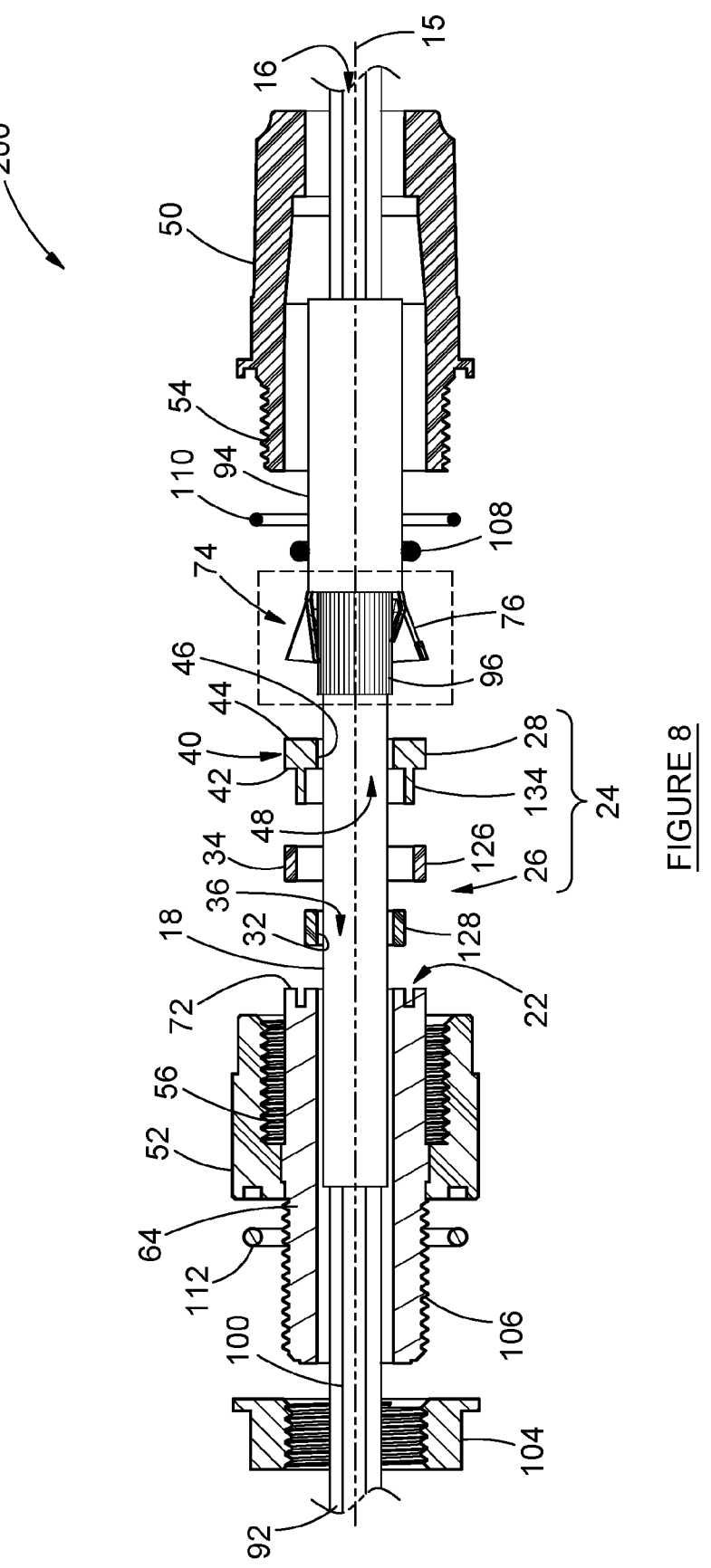
FIG. 8 is a section on line VIII in FIG. 7.

Referring to FIGS. 1 to 6, the elongate body 12 comprises a first body part 50 and a second body part 52 which are axially adjacent each other. As best shown in FIGS. 6 and 8, the first body part 50 and the second body part 52 comprise first and second mutually cooperating formations 54 and 56 respectively, which when actuated cause the first body part 50 and the second body part 52 to be urged towards each other. The first and second mutually cooperating formations 54 and 56 are typically in the form of external and internal threads, respectively. In use, when the first body part 50 and the second body part 52 are urged together, the annular elastomeric seal 26 is compressed between the seal abutment surface 22 and the first face 42 of the seal deforming member 28.

As best shown in FIG. 6, the first body part 50 defines a first part 58 of the axially extending passage 14 from a first end 60 to a second end 62 of the first body part 50. The first body part 50 comprises a sloping formation 63 adjacent the first part 58 of the axially extending passage 14 and intermediate the first end 60 and the second end 62. The first mutually cooperating formation 54 is provided towards the second end 62 of the first body part 50. The second body part 52 comprises a first tubular part 64 and a second tubular part 66 which are concentric with each other. The second tubular part 66 has a larger radius than the first tubular part 64. The first tubular part 64 defines a second part 68 of the axially extending passage 14 from a first end 70 to a second end 72 of the first body part 50. The first tubular part 64 is made of an electrically conductive material. In use, the second end 72 of the second body part 52 presents the seal abutment surface 22. The second tubular part 66 comprises the second mutually cooperating formation 56.

Referring to FIGS. 2 and 6 again, a cable gripping member 74 is locatable in the axially extending passage 14. As is best shown in FIG. 6, the cable gripping member 74 comprises a body 76 having an outer wall 78 and an inner wall 80. The inner wall 80 defines a passage 82 for receiving the cable 16. The inner wall 80 comprises formations 84, such as teeth or serrations for gripping the cable 16. As is best shown in FIG. 3 the body 76 is tubular in configuration and defines an axial slot 86 extending from a first end 88 of the tubular body 76 to a wider second end 90 of the tubular body 76. The cable gripping member 74 is resiliently constrictable. The outer wall 78 is sloped such that the cable gripping member 74 is frustoconical in shape and such that the outer wall 78 cooperates with the sloping formation 63 to constrict the cable gripping member.

In use, and referring to FIGS. 2 and 6 in particular, a region towards an end 92 (shown in FIG. 6) of the cable 16 is stripped by first removing a portion of an outer sheath 94 a first distance from the end to expose a conductive armouring layer 96. Secondly, the conductive armouring layer 96 is removed a second distance, which is less than the first distance, from the end 92 to expose an inner bedding 98 having the above outer surface 18. Thirdly, the inner bedding 98 is removed a third distance from the end 92, which is less than the second distance, to expose a bundle of conductors 100.

With the above cable gland 10 in semi-assembled form (that is with the first and second body parts loosely threadedly connected with each other, the annular elastomeric seal 26, the annular seal deforming member 28 with prongs 30.1 to 30.$n$ received in associated sockets of the seal and the cable gripping member 74 in position in the axially extending passage), the above stripped end region of the cable is sequentially threaded through the first body part 50 (from the first end 60 thereof), the cable gripping member 74, the annular seal deforming member 28, the annular elastomeric seal 26 and the second body part 52, (from the second end 72 of the first tubular part 64). The cable 16 is threaded through the cable gland 10 until a first end 101 of the outer sheath 94 abuts the first end 88 of the cable gripping member 74. The abutment of the outer sheath 94 against the first end 88, ensures that the cable 16 stops in a desired position relative to the cable gland 10. In said desired position, the gripping member 74 is positioned relative to the cable 16 such that the exposed conductive armouring layer 96 extends through the passage 82 and the annular elastomeric seal 26 is positioned relative to the cable 16 such that the exposed inner bedding 98 extends through the first opening 36. Once the cable 16 is in the desired position, the threaded first and second mutually cooperating formations are actuated to urge the first and second body parts towards each other. The sloping formation 63 cooperating with the outer wall 78 serves to compress the cable gripping member 74 radially, so that the formations 84 of the cable gripping member 74 make electrical contact with the exposed conductive armouring layer 96. Upon further actuation of the formations 54 and 56, the first and second body parts 50 and 52 of the cable gland 10 are urged further towards each other and the annular elastomeric seal 26 and the annular seal deforming member 28 are sandwiched between the seal abutment surface 22 and the wider second end 90 of the cable gripping member 74.

As a result, and referring to FIG. 2, the annular elastomeric seal 26 is compressed between the seal abutment surface 22 and the first face 42 of the seal deforming member. This causes the annular elastomeric seal 26 to deform such that the inner sealing surface 32 of the annular elastomeric seal 26 is urged radially inwardly in sealing engagement with the outer surface 18 of the inner bedding 98 of the cable 16 and the outer sealing surface 34 of the annular elastomeric seal 26 is urged radially outwardly to seal against the inner sealing surface 20 of the elongate body 12. As the first body part and second body parts 50 and 52, are further urged towards each other, the plurality of prongs 30.1 to 30.$n$ protrude through respective ones of the spaced sockets 38.1 to 38.$n$, such that the distal ends of the prongs abut the seal abutment surface 22. The sizes of the plurality of prongs 30.1 to 30.$n$ and the plurality of sockets 38.1 to 38.$n$ can be selected such that the annular elastomeric seal 26 is protected from excessive seal deformation which may cause damage to the annular elastomeric seal 26 or cause the seal to rupture. Hence, at least one of the plurality of prongs 30.1 to 30.n would act as a limiter of the displacement of the seal deforming member 28 towards the seal abutment surface 22, thereby to protect the seal.

In an embodiment where the annular seal deforming member 28, the plurality of prongs 30.1 to 30.n and the cable gripping member 74 are made of an electrically conductive material, they serve to provide a conductive train between the conductive armouring layer 96 and the conductive first tubular part 64.

Once the first and second body parts 50 and 52 are taut, the second body part 52 is attached to a conductive support wall 102 of an enclosure (not shown), by attaching a threaded nut 104 to a threaded section 106 of the conductive first tubular part 64. Once the cable gland 10 is attached to the conductive support wall 102, an electrically conductive path is formed from the conductive armouring layer 96 through the electrically conductive cable gripping member 74, the electrically conductive annular seal deforming member 28, the electrically conductive plurality of prongs 30.1 to 30.n, the electrically conductive first tubular part 64 of the second body part 52 and to the conductive support wall 102.

A first ancillary seal member 108 is located inside the first body part and provides a seal between the first body part and an outer surface of the outer sheath of the cable, to stop ingress of fluid which may have entered the passage from the first end 60. A second ancillary seal member 110 provides a seal between the first body part 50 and the second body part 52. The seal prevents fluid from entering the passage through a space between the mutually cooperation formations. A third ancillary seal member provides a seal between the second body part and the conductive support wall 102, to prevent fluid from entering the enclosure (not shown).

The annular elastomeric seal 26 serves to prevent ingress of fluid into a region where the first tubular part 64, the annular seal deforming member 28 and cable gripping member 74 abut each other.

Therefore, the cable gland sealing arrangement 24 together with the cable gripping member 74 serve at least two purposes namely (a) providing an electrically conductive path between the conductive armouring layer 96 and the conductive support wall 102 and (b) preventing the ingress of fluid into a region where electrically conductive parts are located namely, the seal abutment surface 22, the annular seal deforming member 28, the plurality of prongs 30.1 to 30.n and the cable gripping member 74.

Figure 7:
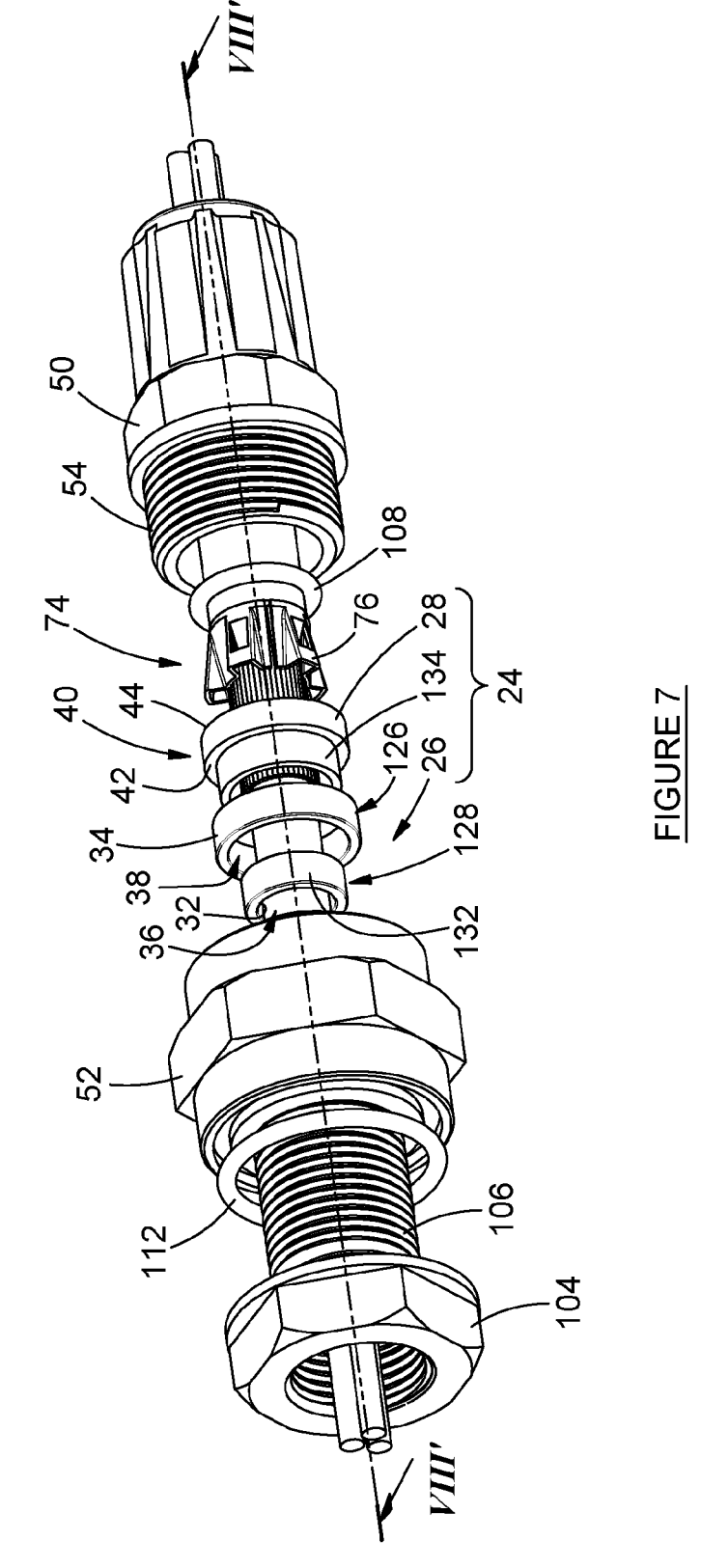
FIG. 7 is a diagrammatic perspective view of a second example embodiment of the cable gland in exploded form.
Figure 9:
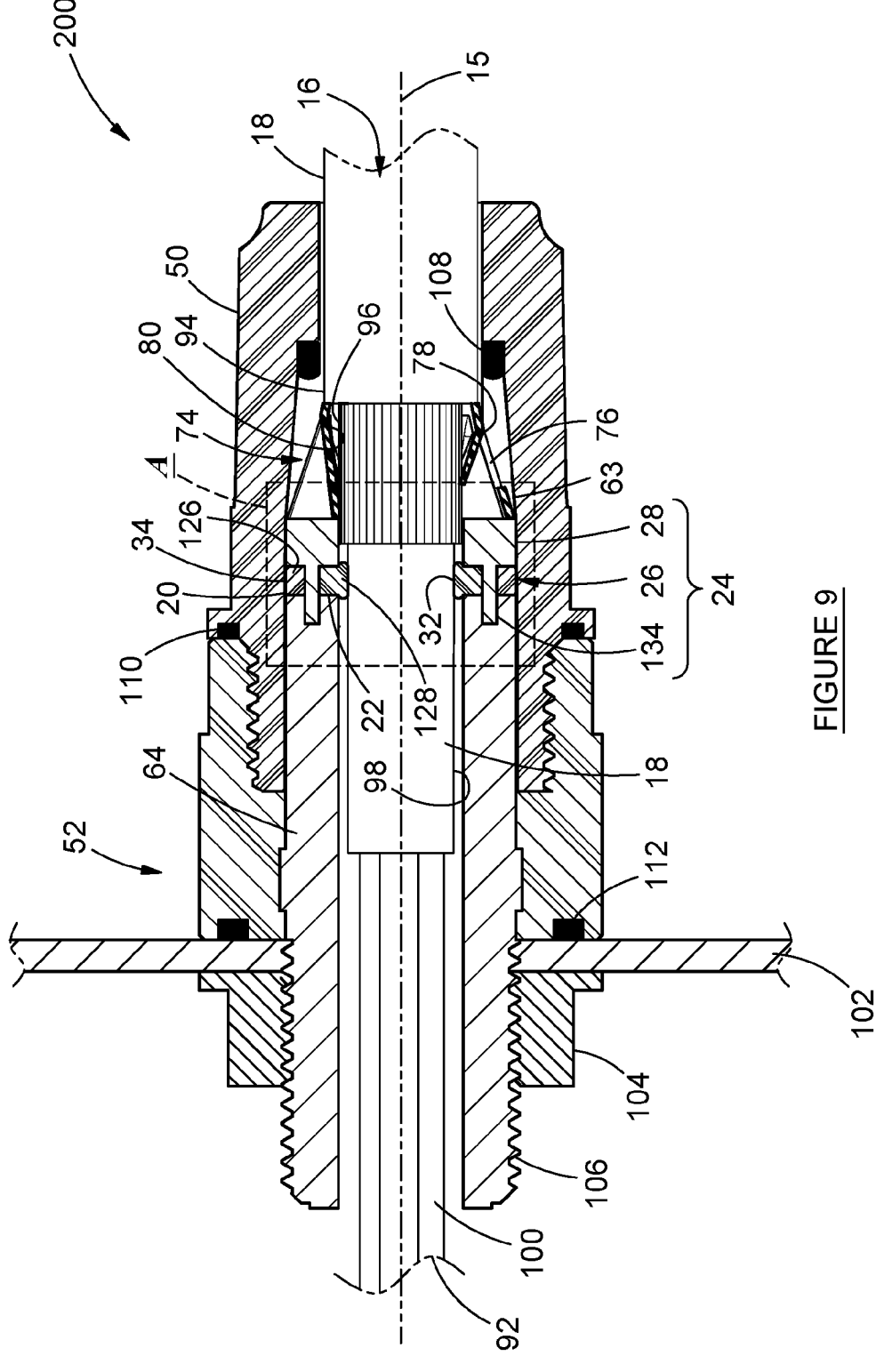
FIG. 9 is a partially sectioned view of the second example embodiment of the cable gland in assembled form.
Figure 10:
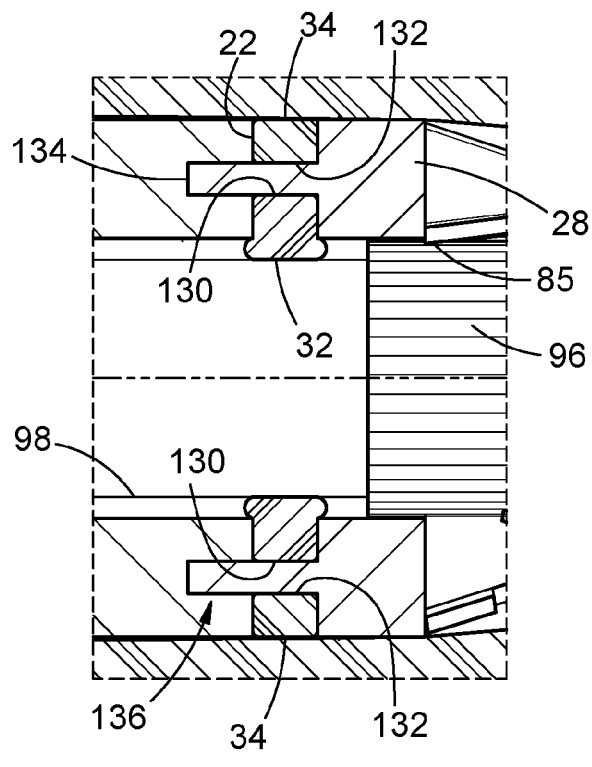
FIG. 10 is a more detailed view of the delineated part A in FIG. 9.
Figure 11:
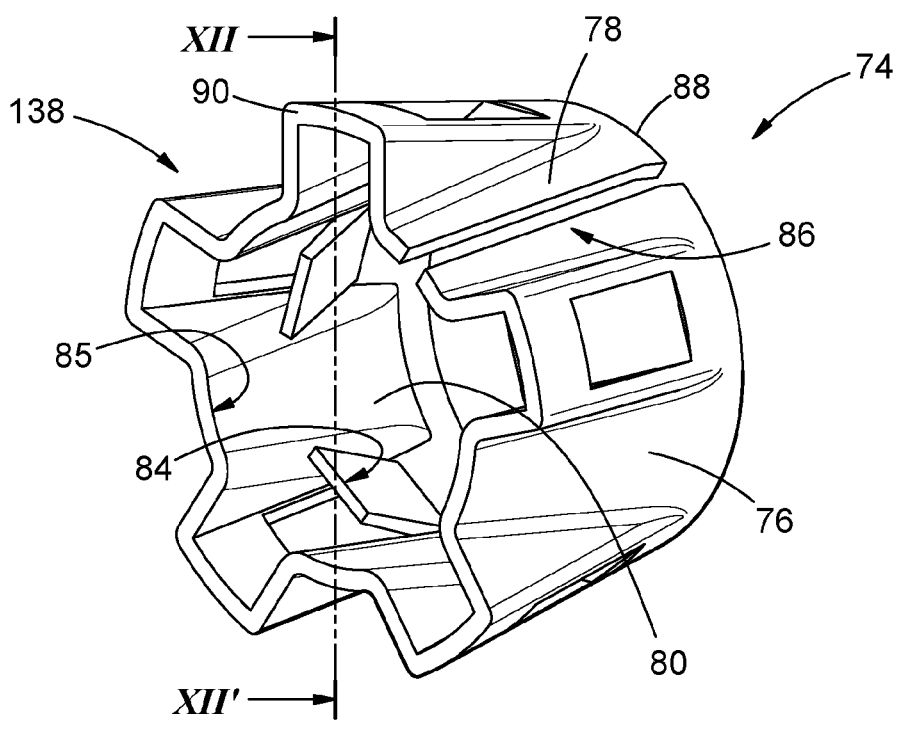
FIG. 11 is a diagrammatic perspective view of a cable gripping member of the second example embodiment.
Figure 12:
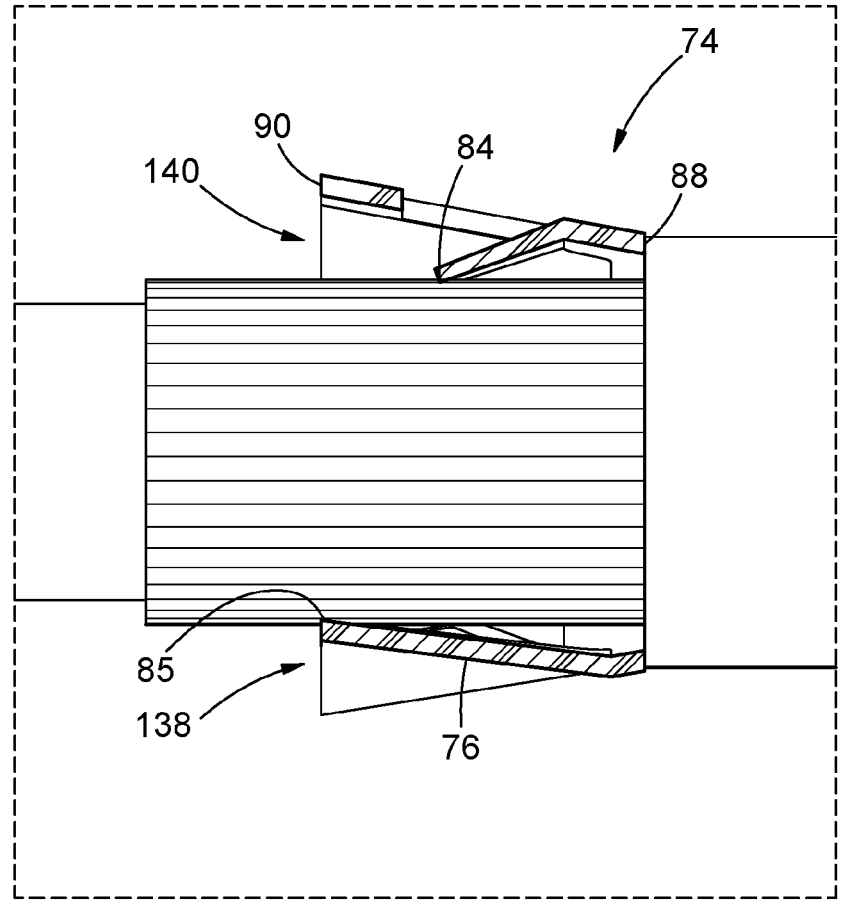
FIG. 12 is a section on line XII in FIG. 11.

In FIGS. 7 to 9 there is shown a second example embodiment of the cable gland, designated with reference numeral 200. In FIGS. 10 to 12 more detail of the second example embodiment is shown. Save for the features which are discussed below, the cable gland 200 is generally similar to the cable gland 10 in FIGS. 1 to 6 and like parts are indicated by like numerals.

The second example embodiment differs from the first example embodiment in that the annular elastomeric seal 26 comprises a first annular elastomeric seal part 126 having an inner wall 130 and an inner diameter and a concentric second annular elastomeric seal part 128 having an outer wall 132 and an outer diameter which is smaller than the inner diameter of the first annular elastomeric seal part 126. The first annular elastomeric seal part 126 presents the outer sealing surface 34 of the annular elastomeric seal 26 and the second annular elastomeric seal part 128 presents the inner sealing surface 32 of the annular elastomeric seal 26. In this embodiment the at least one further opening 38 is ring-shaped and defined between the inner wall 130 and the outer wall 132.

The second example embodiment further differs from the first example embodiment in that the at least one axially extending link 30 comprises a rigid tubular stub 134. The rigid tubular stub 134 is integrally formed with the first face 42 of the annular seal deforming member 28. In other embodiments (not shown) the rigid tubular stub 134 may be integrally formed with the seal abutment surface 22. In use, the rigid tubular stub 134 extends through the ring-shaped further opening 38. In this embodiment the seal abutment surface 22 defines a circular groove or slot 136 configured to receive at least a part of the rigid tubular stub 134. A depth of the circular slot and a height of the rigid tubular stub 134 can be selected such that the annular elastomeric seal 26 is protected from excessive seal deformation which may cause damage to the annular elastomeric seal 26 or cause the seal to rupture. Hence, the rigid tubular stub 134 would act as a limiter of the displacement of the seal deforming member towards the seal abutment surface, thereby to protect the seal.

The second example embodiment further differs from the first example embodiment in that the inner wall 80 of the cable gripping member 74 slopes from the first end 88 of the body 76 having a first inner diameter to the second end 90 of the body 76 having a second inner diameter which is smaller than the first diameter. The formations 84 for gripping the cable 16 are integrally formed with the body 76. The formations 84 are equi-spaced around a circumference of the inner wall 80. In this embodiment the outer wall 78 of the cable gripping member 74 defines outer channels 138 between the first end 88 and the second end 90 and the inner wall 80 of the cable gripping member 74 defines inner channels 140 between the first end 88 and the second end 90. As a result of the smaller second inner diameter at the second end 90 of the cable gripping member 74, the cable gripping member is capable of also gripping the cable 16 with a region 85 towards the second end 90 of the cable gripping member 74.

It is also believed that the cable gland is a universal gland that could be used with both a SWA cable and an unarmoured cable.

It will be appreciated that there are many variations in detail on the cable gland without departing from the scope and sprit of the appended claims.

For example, in some embodiments where only unarmed cables are catered for, at least one and even all of the cable gripping member, the annular seal deforming member, the at least one axially extending rigid link and the first tubular part of the second body part may be made of a dielectric or electrically insulating material.

In some embodiments the seal deforming member may be integrally formed with the second end of the cable gripping member.

The invention claimed is:

1. A cable gland comprising:
an elongate body defining an axially extending passage configured to receive a cable having an outer surface, the elongate body comprising an inner sealing surface and a seal abutment surface adjacent the passage, the seal abutment surface facing in a first direction; and
a cable gland sealing arrangement locatable in the passage, the cable gland sealing arrangement comprising:
an annular elastomeric seal comprising an inner sealing surface and an outer sealing surface and defining a first opening adjacent the inner sealing surface for receiving the cable and at least one further opening between the inner sealing surface and the outer sealing surface, in use, the inner sealing surface, seals against the outer surface of the cable, and the outer sealing surface seals against the inner sealing surface adjacent the passage;

an annular seal deforming member comprising a body having a first face which, in use, abuts the annular elastomeric seal, a second opposed face and an inner wall between the first face and the second opposed face, the inner wall defining a third opening for receiving the cable, and at least one axially extending link which extends from a proximal end to a distal end, the distal end facing towards the seal abutment surface in a second direction opposite to the first direction, in use, the at least one axially extending link extends through the at least one further opening, the distal end abuts the seal abutment surface and the proximal end abuts the first face of the annular seal deforming member.

2. The cable gland as claimed in claim 1 wherein the at least one axially extending link is integrally formed with any one of a) the first face of the annular seal deforming member; and b) the seal abutment surface.

3. The cable gland as claimed in claim 1 wherein the body of the cable gland comprises a first body part and a second body part which are axially adjacent each other, the first and second body parts comprising respective mutually cooperating formations which, when actuated, cause the first and second body parts to be urged towards each other.

4. The cable gland as claimed in claim 3, wherein the first body part defines a first part of the axially extending passage which first part extends from a first end of the first body part to a second end of the first body part, wherein a first of the mutually cooperating formations is provided towards the second end of the first body part, and wherein the second body part comprises first and second concentric tubular parts, the second tubular part having a larger radius than the first tubular part, the first tubular part defining a second part of the axially extending passage which second part extends from a first end of the first tubular part to a second end of the first tubular part, the first end of the first tubular part providing the seal abutment surface and the second tubular part comprising a second of said mutually cooperating formations.

5. The cable gland as claimed in claim 4 wherein the first tubular part is made of electrically conductive material.

6. The cable gland as claimed in claim 1 wherein the annular elastomeric seal is circular in configuration and wherein the inner sealing surface and the outer sealing surface are concentric with each other about a center axis of the annular seal.

7. The cable gland as claimed in claim 6 wherein the annular elastomeric seal comprises a first annular elastomeric seal part having an inner wall having an inner diameter and a concentric second annular elastomeric seal part having an outer wall having an outer diameter which is smaller than the inner diameter of the first annular elastomeric seal part, the first annular elastomeric seal part presenting the outer sealing surface of the annular elastomeric seal, the second annular elastomeric seal part presenting the inner sealing surface of the annular elastomeric seal and wherein the at least one further opening is ring-shaped and is defined between the inner wall of the first annular elastomeric seal part and the outer wall of the concentric second annular elastomeric seal part and wherein the at least one axially extending link is formed integrally with the first face and comprises a tubular stub extending through the at least one further ring-shaped further opening.

8. The cable gland as claimed in claim 1 wherein the body of the annular seal deforming member is circular in configuration.

9. The cable gland as claimed in claim 1 wherein the at least one further opening comprises a plurality of spaced sockets located on a first circle between the inner sealing surface and the outer sealing surface of the annular elastomeric seal, the first circle having a first radius and wherein the plurality of spaced sockets are equi-spaced from one another on the first circle by a first distance.

10. The cable gland as claimed in claim 9 wherein the at least one axially extending link comprises a plurality of prongs which are integrally formed with the first face on a second circle having a second radius, the first circle and second circle are concentric and the first radius is equal to the second radius.

11. The cable gland as claimed in claim 10 wherein each of the plurality of prongs is tapered in a direction from a respective proximal end immediately adjacent the first face towards a respective distal end of the prong and wherein the plurality of prongs are equi-spaced from one another by a second distance which is the same as the first distance.

12. The cable gland as claimed in claim 9 wherein each of the plurality of spaced sockets is shaped similar to a prong.

13. The cable gland as claimed in claim 1 further comprising a cable gripping member locatable in the axially extending passage, the cable gripping member comprising a body having a first end, a second end, an outer wall and an inner wall defining a passage for receiving the cable, the inner wall comprising formations for gripping the cable.

14. The cable gland as claimed in claim 13 wherein the cable gripping member is tubular in configuration and defines an axial slot extending from the first end of the body of the cable gripping member to the second end of the body of the cable gripping member.

15. The cable gland as claimed in claim 14 wherein the cable gripping member is resiliently constrictable.

16. The cable gland as claimed in claim 13 wherein the outer wall of the cable gripping member slopes from the first end having a first outer diameter to the second end having a second outer diameter, which is larger than the first outer diameter.

17. The cable gland as claimed in claim 13 wherein the inner wall of the cable gripping member slopes from the first end having a first inner diameter to the second end having a second inner diameter, which is smaller than the first inner diameter.

18. The cable gland as claimed in claim 13 wherein the second face of the annular seal deforming member, in use, abuts the second end of the cable gripping member.

19. The cable gland as claimed in claim 13 wherein at least one of the cable gripping member, the annular seal deforming member and the at least one axially extending link are made of electrically conductive material.

* * * * *